United States Patent Office 3,405,473
Patented Oct. 15, 1968

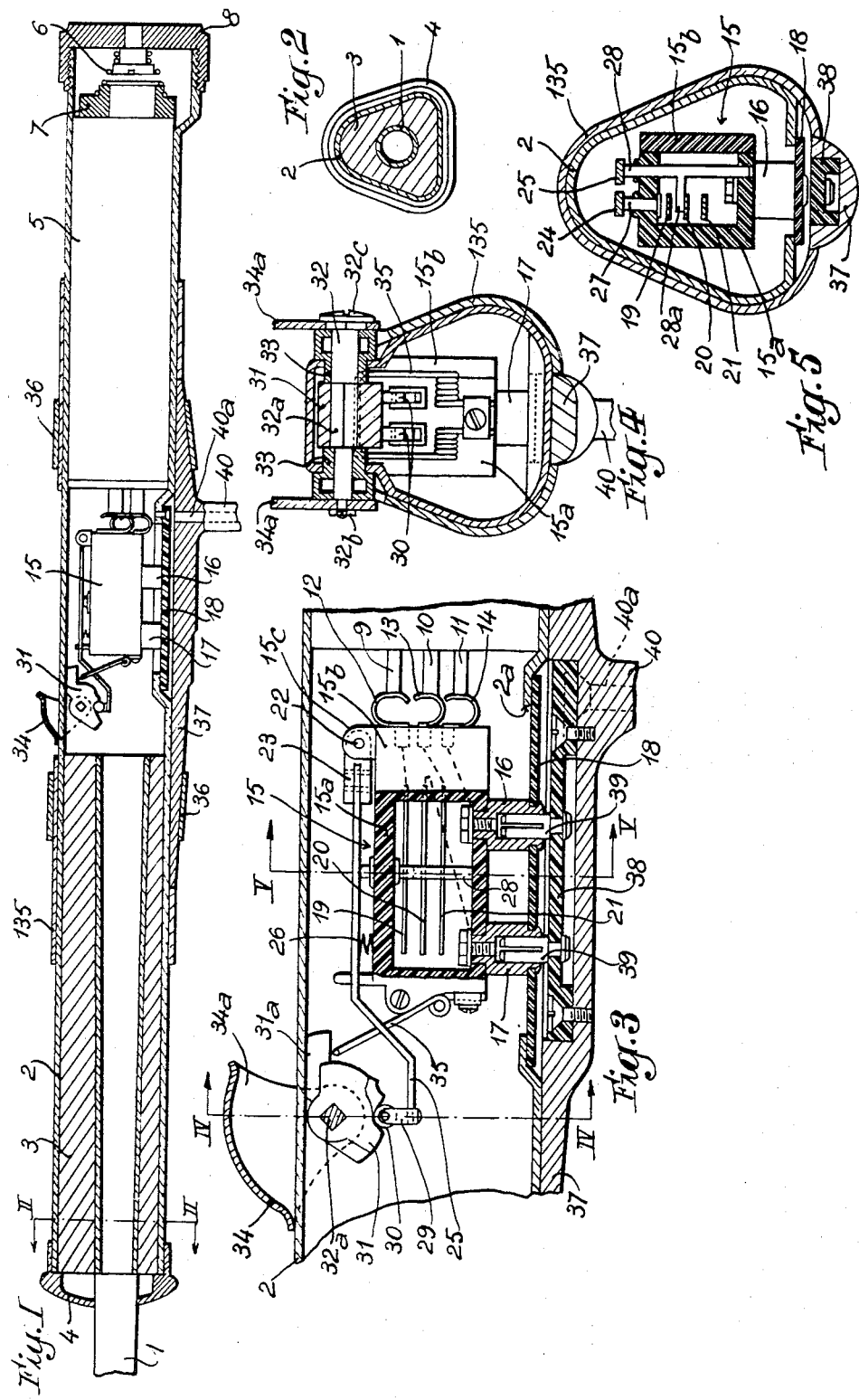

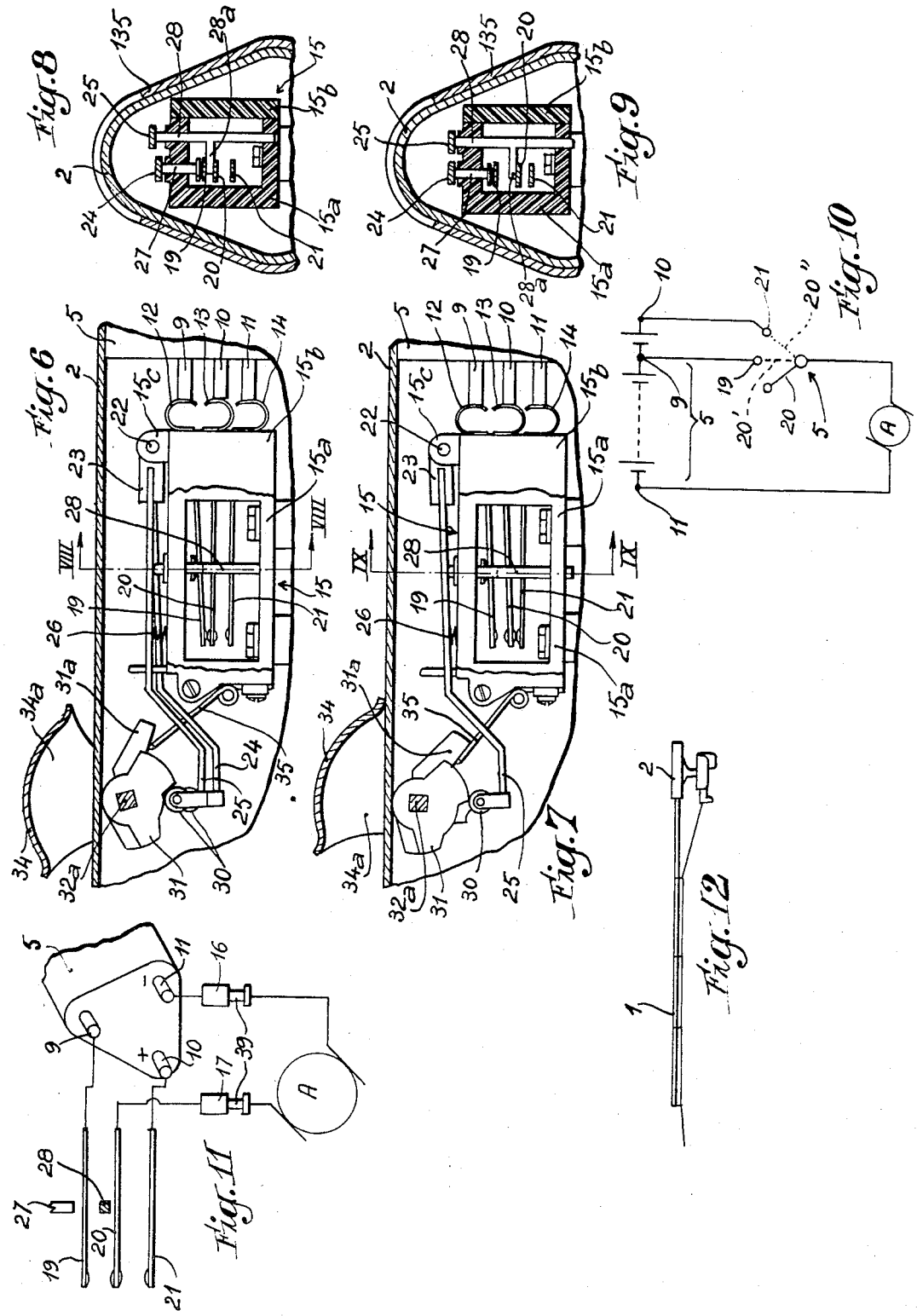

3,405,473
FISHING RODS
Louis Henri Armand Boussageon, Le Pereol, Boite Postale No. 3, Chabeuil, Drome, France
Filed Jan. 11, 1965, Ser. No. 424,761
Claims priority, application France, Feb. 3, 1964, 661; Mar. 9, 1964, 663
8 Claims. (Cl. 43—21)

ABSTRACT OF THE DISCLOSURE

A fishing rod having an electric driving motor; an electric cell with two end terminals and an intermediate terminal; and a two-way, cam operated switch to connect the motor either across the two end terminals of the cell or across one end terminal and the intermediate terminal.

This invention refers to fishing rods and it more particularly concerns a fishing rod adapted to comprise an electrically driven line reel.

A main object of the present invention is to provide a fishing rod the base or handle of which is so arranged as to form a housing for the electric source adapted to supply current to the driving motor of the reel.

Another object of the present invention is to provide a fishing rod having means to automatically insure the connection between the electric source and the driving motor of the reel when the said reel is secured to the rod.

Still another object of the present invention is to provide means whereby the driving motor of the reel may be operated at two different speeds as desired.

The invention accordingly concerns a fishing rod comprising a hollow handle adapted to receive an appropriate electric cell, a pair of contacts adapted to cooperate with corresponding contacts carried by the supporting base of the reel, and a two-way switch which selectively connects one of the contacts of the rod with one or the other of two terminals provided on the cell and corresponding to different voltages with respect to a third or common terminal which is directly connected with the second contact of said pair.

In the annexed drawings:

FIG. 1 is a fragmental longitudinal section of the base or handle of a fishing rod according to an embodiment of the present invention.

FIG. 2 is a transverse section thereof taken along line II—II of FIG. 1.

FIG. 3 is an enlarged fragmental longitudinal section of the rod showing the construction of the two-way switch, the cover of the latter being only partly shown.

FIGS. 4 and 5 are transverse sections taken along lines IV—IV, respectively V—V of FIG. 3.

FIGS. 6 and 7 are views similar to FIG. 3, but illustrating other positions of the switch.

FIGS. 8 and 9 are transverse sections respectively taken along lines VIII—VIII (FIG. 6) and IX—IX (FIG. 7).

FIG. 10 is a diagram of the circuitry of the fishing rod and reel.

FIG. 11 diagrammatically shows the operation of the two-way switch in the circuitry of FIG. 10.

FIG. 12 is a small scale view of the fishing rod with its reel.

The fishing rod illustrated in FIGS. 1 and 12 comprises a rod proper 1 which carries the conventional line guiding rings. This rod has a tubular base or handle member 2. As illustrated in FIG. 2 the cross-section of handle 2 is in the form of a triangle with rounded apices. The end of rod 1 is clamped in an inner sleeve 3 carried by handle 2 and appropriately secured thereto. A cap 4 forms a tight seal between rod 1 and the corresponding end of the said handle.

As illustrated in FIG. 1 the inner sleeve 3 terminates short of the free end of handle 2, thus defining within the latter a free inner space or chamber, and this chamber houses an electric cell adapted to supply electric current to the reel driving motor and a two-way switch to control the latter. The cell 5 is of generally triangular cross section, in accordance with the inner contour of handle 2. It is urged towards the left, i.e. towards sleeve 3, by a coil spring 6 disposed between a pusher block 7 and an end cover 8 screwed on the circular end of handle 2. The front side of the cell, i.e. its transverse side nearer to sleeve 3, carries three terminals, namely an intermediate terminal 9, a first end terminal 10 and a second end terminal 11, which have been illustrated in FIGS. 3, 6 and 7 as vertically spaced from each other for the sake of clearness but which are actually disposed each adjacent one corner of the triangular front face of the cell, as shown in FIG. 11. The inner arrangement of the cell is such that the second end terminal 11 is negative with respect to the first end terminal 10 which is positive, the voltage difference between terminals 10 and 11 being for instance 7.5 volts, while the intermediate terminal 9 corresponds to a voltage difference of 6 volts with respect to the second end terminal 11.

Under the action of spring 6 the three terminals 9, 10, 11 of cell 5 are applied against three corresponding contacting blades 12, 13, 14 secured against the rear side of the two-way switch 15. Switch 15 comprises a box-like casing 15a of insulating material closed by a flat lateral cover 15b. The lower side of casing 15a carries two downwardly opening metallic tubular sockets 16 and 17 (see FIG. 3) which are riveted on an insulating plate 18 appropriately secured in a lateral opening 2a provided in the wall of handle 2. As explained below, these sockets are adapted to be connected with the driving motor A of the reel (see FIG. 11).

The rear side of casing 15a carries three superposed resilient switch blades, namely a first blade 19, a second blade 20 and a third blade 21, which extend forwardly within the inner space of the casing, each switch blade having at its free end a small contact block (unreferenced in the drawing). The upper or first switch blade 19 is electrically connected with contacting blade 12 if the cell is properly positioned, with the intermediate terminal 9 thereof, while the lower or third switch blade 21 is connected with contacting blade 13 and therefore with the positive or first end terminal 10 of the cell. As to the intermediate or second switch blade 20, it is directly connected with socket 17. Socket 16 is in turn directly connected with the third contacting blade 14 and with the negative or second end terminal 11 of the cell. All these connections have been illustrated in dash lines in FIG. 3.

The upper side of casing 51a has two lugs 15c (FIG. 3) which support a transverse pin 22 on which two blocks 23 are rotatably mounted. Blocks 23 respectively carry longitudinal arms 24 and 25 which are urged upwardly by springs such as 26. These arms cooperate with two vertical pusher rods 27 and 28 (see FIG. 5) which are slidably mounted in the insulating casing 15a. Pusher rod 27 acts directly on the upper switch blade 19, while pusher 28, which is laterally disposed with respect to switch blades 19–21, has a lateral finger 28a adapted to actuate the intermediate switch blade 20. Of course means are provided to prevent pusher rod 28 from rotating, as for instance by making same of non-circular cross-section. Further pusher rods 27 and 28 are preferably made of insulating material.

Each arm 24, 25 carries at its free end a small rotatable roller 30 adapted to cooperate with a cam member 31. Cam member 31 is mounted on the square central portion 32a (FIG. 4) of a transverse shaft 32. Shaft 32 is rotatably supported by two bearings 33 appropriately secured to the walls of handle 2, and its ends are of non-circular cross-section to receive the branches 34a of a bifurcated actuating member 34, one of the said branches being clamped on the smaller end of shaft 32 by a nut 32b, while the other branch is retained axially by a head 32c formed at the other end of the said shaft.

Cam member 31 is so formed as to comprise for the rollers 30 of arms 24 and 25 two spaced peripheral cam surfaces, these surfaces being so arranged that the said arms are actuated in succession. Cam member 31 further comprises a radial extension 31a (see more particularly FIGS. 6 and 7) adapted to cooperate with a stirrup-shaped spring 35 secured to the front side of casing 15a. This spring tends to return cam member 31 to the position illustrated in FIGS. 1 and 3, for which extension 31a engages the upper wall of handle 2. At this position rollers 30 are themselves at their position nearest to shaft 32, arms 24 and 25 being raised. The switch blades 19, 20 and 21 are horizontal and the intermediate blade 20 is thus spaced from the upper and lower blades 19 and 21. Socket 17 is not therefore connected with the terminals of the cell. The reel driving motor A (see FIG. 11) is thus unenergized.

If the operator pulls somewhat actuating member 34 towards the free end of the rod, this member rotates clockwise in FIGS. 1, 2, 6 and 7 against the action of spring 35 and it reaches the position shown in FIGS. 6 and 8. Cam member 31 then lowers the roller 30 carried by arm 24. Pusher rod 27 therefore in turn lowers the upper or first switch blade 19 which thus engages the intermediate or second switch blade 20 which has not yet been lowered by pusher rod 28, since arm 25 has not been actuated by cam member 31. Socket 17 is thus connected with the intermediate terminal 9 of cell 5 and the reel driving motor A (FIG. 11) is operated under a moderate voltage which corresponds to normal operating conditions.

If actuating member 34 is fully pulled towards the free end of the rod, i.e. towards the right in FIG. 1, as shown in FIGS. 7 and 9, then the roller 30 of arm 25 is in turn actuated, arm 25 is lowered and pusher rod 28 acts on the intermediate or second switch blade 20. The latter therefore disengages the upper or first blade 19 and engages the lower or third blade 21. Socket 17 is then connected with the positive terminal 10 of cell 5 and the reel driving motor A (FIG. 11) is operated under the full voltage of the cell to cause winding of the line at a higher speed.

The above-described operation may be very diagrammatically summarized as indicated in FIG. 10. Cell 5 comprises a number of dry elements (as for instance four) between the common negative or second terminal 11 and the intermediate or lower voltage terminal 9, and additional elements (as for instance a single one) between terminal 9 and the higher voltage terminal 10. The intermediate or second blade 20 is illustrated in the form of the movable member of a conventional two-way switch 15, while blades 19 and 21 form the two successive stationary contacts thereof. At the position in full lines of member 20 motor A is at standstill. At the position in dash lines 20' of the said member motor A is operated at a moderate speed under the lower voltage (as for instance 6 volts), while at the position in dotted lines 20'', motor A operates at a higher speed under the full voltage of the cell (as for instance 7.5 volts).

The central portion of the handle 2 of the rod is covered by a sleeve 135 on which are slidably mounted the conventional rings 36 adapted to retain against handle 2 the elongated base 37 of the reel frame. Sleeve 135 and rings 36 are of course triangular in cross-section as handle 2 itself. Further sleeve 135 has an upper opening for passage of the bifurcated actuating member 34 and a lower opening of elongated shape in which the base 37 of the reel frame is disposed with a reduced clearance. Base 37 has a longitudinal recess 37a (see FIG. 3) in which is fixed an insulating plate 38 which carries two upwardly directed plugs 39 adapted to cooperate with the above-described sockets 16 and 17. These plugs 39 are connected with the driving motor of the reel (motor A in FIG. 11) by wires which pass through an axial bore 40A provided in the bracket or arm 40 through which base 37 is permanently secured to the reel frame. Owing to this arrangement the reel driving motor is automatically connected with the electric cell 5 and with the two-way switch 15 when the reel is mounted on the rod without having to provide outer connecting means.

I claim:

1. In a fishing rod adapted to be associated with a line reel having an electric driving motor, an electric cell having two end terminals of opposite polarities and an intermediate terminal, the potential difference between said intermediate terminal and any of said end terminals being smaller than the potential difference between said end terminals; and means to electrically connect said electric cell with the motor of said reel, said means embodying a two-way switch having contacts which are shiftable to connect said motor either across said end terminals of said cell or across one of said end terminals and said intermediate terminal.

2. In a fishing rod adapted to be associated with a line reel having an electric driving motor, a hollow handle member at one end of said rod; an electric cell removably disposed within said hollow handle member, said cell having a first end terminal of one polarity, a second end terminal of the other polarity and an intermediate terminal with the potential difference between said intermediate terminal and said second end terminal being smaller than the potential difference between said first and second end terminals; means on said handle member to receive said line reel and to secure same against said member; a two-way switch also disposed within said hollow handle member, said switch having first, second and third contact members with said second contact member connectable either with said first contact member or with said third contact member; means to connect the motor of said line reel with said second end terminal of said cell and with said second contact member of said two-way switch; means to connect said first and third contact members of said switch respectively with said intermediate terminal and with said first end terminal of said cell; and means to selectively actuate either said first contact member to cause same to engage said second contact member, or said second contact member to cause same to engage said third contact member to energize said motor under two different voltages.

3. In a fishing rod as claimed in claim 2, said means to connect the motor of said line reel with said second end terminal of said cell and with said second contact member of said two-way switch comprising two pairs of contacts respectively carried by said handle member and by said line reel to cooperate with each other when said line reel is secured against said handle member.

4. In a fishing rod as claimed in claim 2, said first, second and third contact members being respectively in the form of a first, a second and a third resilient blade, said actuating means comprising pushing means acting either on said first resilient blade or on said second resilient blade, and cam means to move said pushing means against the resiliency of said first and second resilient blades, said cam means embodying a cam supporting shaft transverse to said hollow handle member, and swingable means exterior to said hollow handle member and secured to said shaft to cause rotation of same in one or the other direction.

5. In a fishing rod as claimed in claim 4, said pushing means comprising a first and a second slidable pusher rod substantially parallel to each other and each having a first and a second end, said first pusher rod acting on said first blade by its second end and said second pusher rod having a lateral finger acting on said second blade; and said transverse shaft carrying a first and a second cam surface, respectively, acting on the first ends of said first and second pusher rods.

6. In a fishing rod having a line reel embodying an electric driving motor associated therewith, with said reel being removably secured to said rod, an electric cell removably carried by said rod to energize said motor, and electrical connecting means between said cell and said motor, said electrical connecting means comprising two pairs of electrical contacts respectively carried by said rod and by said line reel to cooperate with each other only when said line reel is secured to said rod.

7. In a fishing rod as claimed in claim 6, wherein said line reel comprises a supporting arm with a base at the end of said arm to be laterally applied against said rod, one of said pairs of contacts being carried by said base.

8. A fishing rod comprising a hollow handle member at one end of said rod; an electric cell disposed within said hollow handle member; a line reel removably secured against said hollow handle member, said line reel having an electric driving motor incorporated therein and embodying a supporting arm laterally applied against said hollow handle member, and means to electrically connect said electric cell with said electric driving motor only when said line reel is secured to said hollow handle member.

References Cited

UNITED STATES PATENTS

| | | | |
|---|---|---|---|
| 1,062,488 | 5/1913 | McCluer et al. | 43—21 |
| 1,474,942 | 11/1923 | Probst | 318—139 |
| 2,405,769 | 8/1946 | Stoner | 318—139 X |
| 3,064,385 | 11/1962 | Pickard | 43—21 |
| 3,168,157 | 2/1965 | Ulinski | 318—139 X |
| 3,195,829 | 7/1965 | Balaquer | 242—84.1 |
| 3,246,859 | 4/1966 | Martin | 242—84.1 |
| 3,248,819 | 5/1966 | Stealy | 43—21 |
| 3,252,239 | 5/1966 | Moeller | 43—21 |

WARNER H. CAMP, *Primary Examiner.*